United States Patent
Chan et al.

(10) Patent No.: US 9,923,955 B2
(45) Date of Patent: *Mar. 20, 2018

(54) VIRTUAL FENCING GRADIENT TO INCREMENTALLY VALIDATE DEPLOYED APPLICATIONS DIRECTLY IN PRODUCTION CLOUD COMPUTING ENVIRONMENT

(71) Applicant: International Business Machines Corporation, Armonk, NY (US)

(72) Inventors: Wei L. Chan, Cary, NC (US); Adam R. Geiger, Cary, NC (US); Hugh E. Hockett, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,415

(22) Filed: Nov. 23, 2015

(65) Prior Publication Data

US 2016/0173573 A1    Jun. 16, 2016

Related U.S. Application Data

(63) Continuation of application No. 14/571,376, filed on Dec. 16, 2014.

(51) Int. Cl.
*H04L 29/08* (2006.01)
*H04L 12/911* (2013.01)
*H04L 12/26* (2006.01)

(52) U.S. Cl.
CPC .............. *H04L 67/10* (2013.01); *H04L 43/50* (2013.01)

(58) Field of Classification Search
None
See application file for complete search history.

(56) References Cited

U.S. PATENT DOCUMENTS 8,131,519 B2   3/2012   Wood et al.
8,260,603 B2   9/2012   Cherkasova et al.
(Continued)

FOREIGN PATENT DOCUMENTS

EP    2246782 A1    3/2010
WO    0140984 A1    6/2001
WO    2013113532 A1    8/2013

OTHER PUBLICATIONS

Scaled Agile Framework, "DevOps Abstract", Oct. 31, 2014, scaledagileframework.com/devops/.
(Continued)

*Primary Examiner* — Philip Chea
*Assistant Examiner* — Hassan Khan
(74) *Attorney, Agent, or Firm* — Michael A. Petrocelli (57) ABSTRACT

A method and a system for enabling resource consumption for one or more applications running in a virtual production environment within a production environment based on a testing analysis. The method and system includes generating a multi-stage virtual computing environment within a computing production environment. A software application can run in the virtual computing environment. The method and system provides access to resources in the computing production environment from the virtual computing environment. The method and system allows the software application access to the computing production environment based on a testing analysis and uses abstraction layers to control allocation of resources in the production environment.

5 Claims, 6 Drawing Sheets

(56) References Cited

U.S. PATENT DOCUMENTS

| | | | | |
|---|---|---|---|---|
| 9,292,350 | B1* | 3/2016 | Pendharkar | G06F 9/5044 |
| 2008/0271025 | A1* | 10/2008 | Gross | G06F 11/3051 718/102 |
| 2010/0082320 | A1* | 4/2010 | Wood | G06F 9/5011 703/22 |
| 2010/0082321 | A1* | 4/2010 | Cherkasova | G06F 11/3447 703/22 |
| 2010/0281458 | A1* | 11/2010 | Paladino | G06F 8/71 717/106 |
| 2010/0319004 | A1* | 12/2010 | Hudson | G06F 9/5072 719/313 |
| 2012/0102486 | A1* | 4/2012 | Yendluri | G06F 8/60 717/177 |
| 2012/0185913 | A1* | 7/2012 | Martinez | G06F 9/455 726/1 |
| 2013/0042123 | A1* | 2/2013 | Smith | G06F 9/5077 713/300 |
| 2015/0324232 | A1* | 11/2015 | Wang | G06F 9/455 718/1 |
| 2016/0253211 | A1* | 9/2016 | Franco | H04L 67/1097 705/7.25 |

OTHER PUBLICATIONS

Bittman, The Private Cloud Sandbox, Apr. 16, 2010, http://blogs.gartner.com/thomas_bittman/2010/04/16/the private-cloud-sandbox/, pp. 1-9.

Skytap, "IT Sandbox", Accessed on Oct. 24, 2014, http://www.skytap.com/solutions/other-solutions/it-sandbox, pp. 1-3.

Santhanam et al., "Deploying Virtual Machines as Sandboxes for the Grid", 2005, Proceeding WORLDS'05 Proceedings of the 2nd Conference on Real, Large Distributed Systems, vol. 2, pp. 7-12.

Mell et al., "The NIST Definition of Cloud Computing", Recommendations of the National Institute of Standards and Technology, NIST Special Publication 800-145, Sep. 2011, 7 pages.

IBM, "Rational Test RealTime", http://www-03.ibm.com/software/products/en/realtime/, Accessed on Dec. 16, 2014.

IBM: List of IBM Patents or Patent Applications Treated as Related (Appendix P), Nov. 23, 2015, pp. 1-2.

Pending U.S. Appl. No. 14/571,376, filed Dec. 16, 2014, entitled: "Virtual Fencing Gradient to Incrementally Validate Deployed Applications Directly in Production Cloud Computing Environment", pp. 1-38.

* cited by examiner

VIRTUAL FENCING GRADIENT TO INCREMENTALLY VALIDATE DEPLOYED APPLICATIONS DIRECTLY IN PRODUCTION CLOUD COMPUTING ENVIRONMENT

BACKGROUND

An IT (Information Technology) provider can test a new application to provide a sandbox or test environment that can recreate a production-like environment which may include a virtual data center and advanced network. Typically, the environment is separate from a customer's production environment and requires a separate deployment when the workload is ready to be run in the production environment.

Approaches can be used to provision new applications in a production environment. One way is provide development, integration, staging, to production environment as a life cycle progression. The application can be implemented and created in a development environment by a team, handed off to an operations team for installation in a staging environment to validate that everything works in a customer like scenario. Finally, the application can be provisioned a final time in the destination production environment, which may be by another team. This approach can be time consuming since the application is reinstalled and handed off between different environments and personnel/teams. The approach can also be prone to error, since the same application tested and validated, is reinstalled on a different set of hardware by different people.

Another approach is known as development and operations (a.k.a., DevOps), which can include a development team able to handle making continuous incremental updates to the production environment directly. However, this approach does not use a staging environment for validation, which can expose changes made directly on the production infrastructure to application defects that may not have been screened by tests in the build process.

SUMMARY

According to an aspect of the invention, a method enables resource consumption for applications running in a virtual environment within a production environment based on a testing analysis. A multi-stage virtual computing environment is generated within a computing production environment. A software application runs in the virtual computing environment. The method provides access to resources in the computing production environment from the virtual computing environment. The software application access to the computing production environment is allowed based on a testing analysis and using abstraction layers to control allocation of the resources in the production environment.

In another aspect according to the invention, a computer program product enables resource consumption for applications running in a virtual environment within a production environment based on a testing analysis. The computer program product comprises a computer readable storage medium having program instructions embodied therewith, wherein the computer readable storage medium is not a transitory signal per se, the program instructions executable by a computer to cause the computer to perform a method. The method includes: generating a multi-stage virtual computing environment within a computing production environment; running a software application in the virtual computing environment; providing access to resources in the computing production environment from the virtual computing environment; and allowing the software application access to the computing production environment based on a testing analysis and using abstraction layers to control allocation of the resources in the production environment.

In another aspect according to an embodiment of the invention, a computer system enables resource consumption for applications running in a virtual environment within a production environment based on a testing analysis, the computer system comprises: one or more computer processors, one or more computer-readable storage media, and program instructions stored on one or more of the computer-readable storage media for execution by at least one of the one or more processors, the program instructions, comprising: generating a multi-stage virtual computing environment within a computing production environment; running a software application in the virtual computing environment; providing access to resources in the computing production environment from the virtual computing environment; and allowing the software application access to the computing production environment based on a testing analysis and using abstraction layers to control allocation of the resources in the production environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
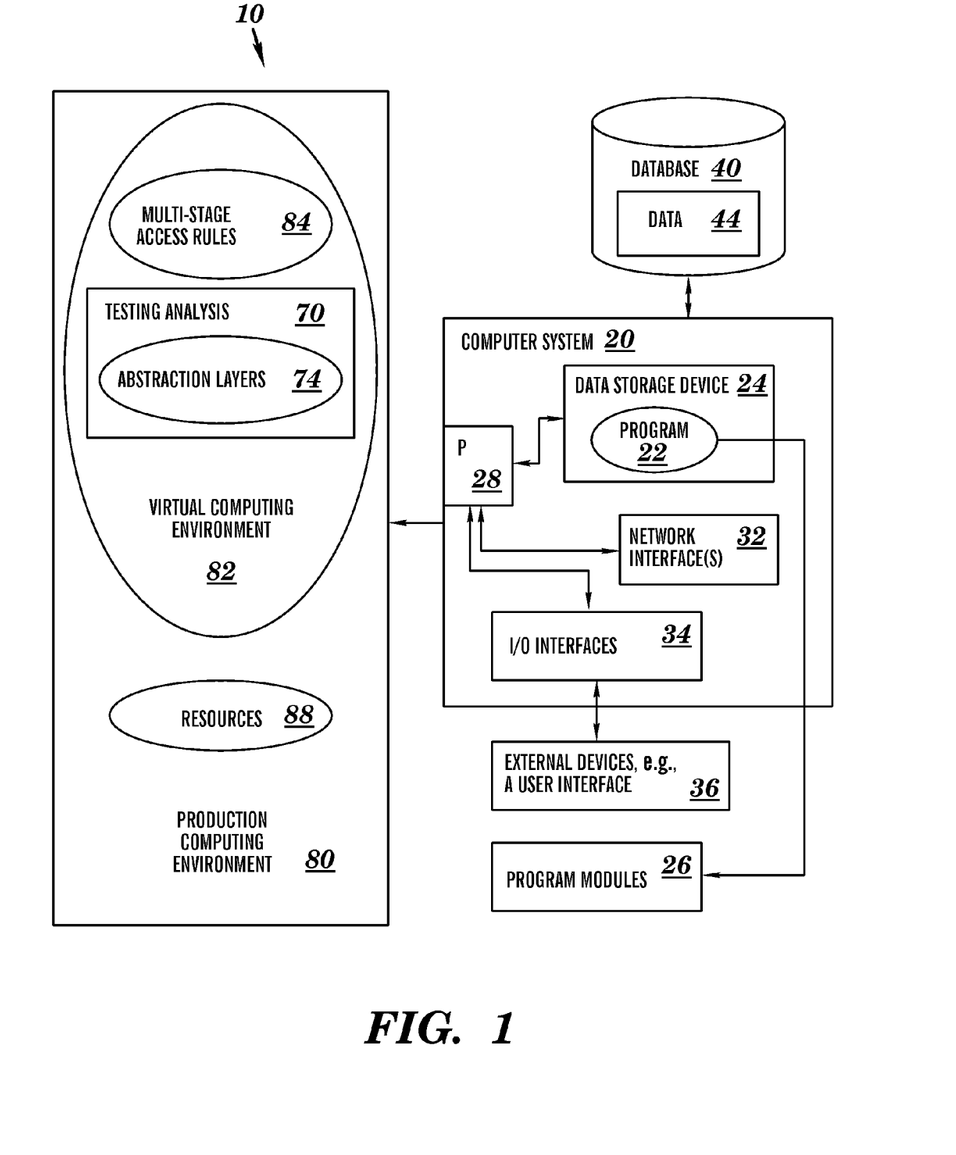
FIG. 1 is a schematic block diagram illustrating an overview of a system and methodology for enabling resource consumption for applications running in a virtual environment within a production environment.
Figure 2:
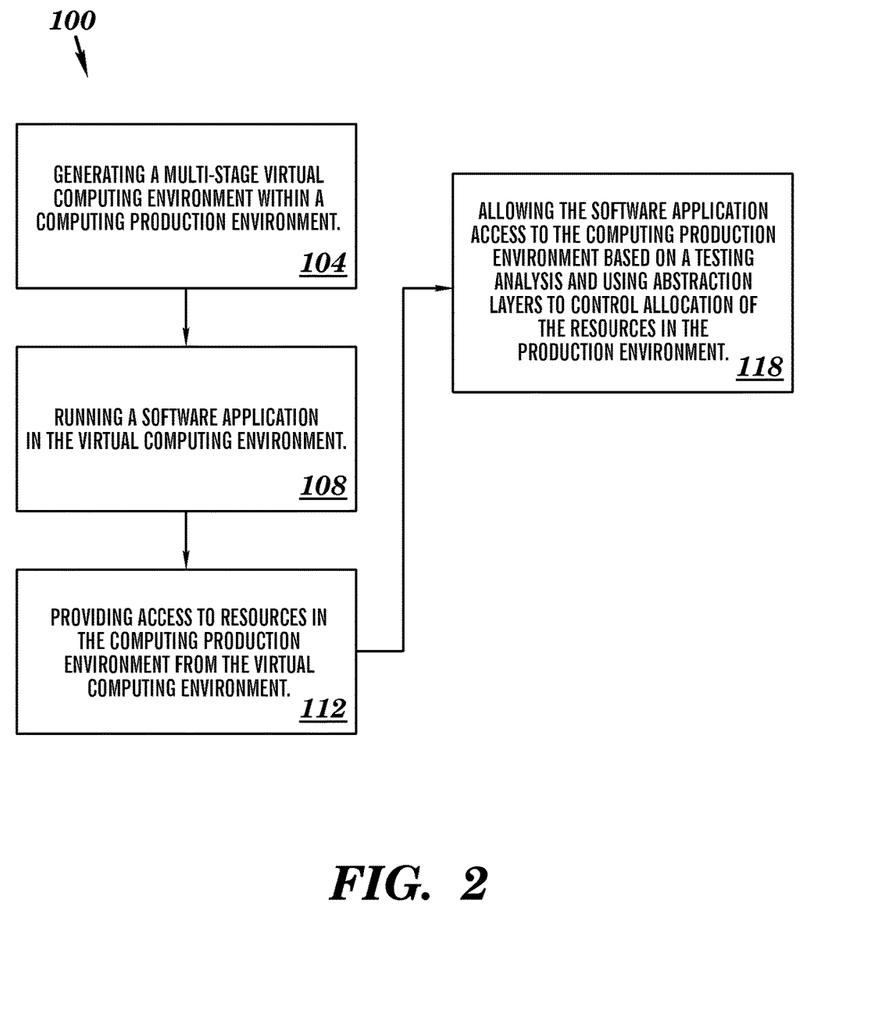
FIG. 2 is a flow chart illustrating a method for enabling resource consumption for applications running in a virtual environment within a production environment.

Referring to FIGS. 1 and 2, a high level discussion of the present disclosure includes, for example, a system 10 and method 100 for enabling resource consumption for applications running in a production environment based on a testing analysis. The method 100 generates (or provides) a multi-stage virtual computing environment 82 (for example, using a computer system 20) within a computing production environment 80, as in block 104.

The method 100 may be embodied in a program 22 embodied on a computer readable storage device, e.g., data storage device 24, which is executable by a processor 28 of the computer 20 (i.e., execute program steps, code, or program code). Data storage may also be embodied as a database 40 and data 44. The program or executable instructions therefrom, may be offered as a service by a provider. The computer 20 and program 22 shown in FIG. 1 are generic representations of a computer and program that may be local to a user, or provided as a remote service, such as a website accessible using a network (e.g., the Internet or cloud services). It is understood that the computer 20 also generically represent herein a computer device such as one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computing device and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

The method 100 can run a software application in the virtual computing environment 82, as in block 108. Multi stage access rules 84 to resources 88 in the computing production environment 80 can be provided from the virtual computing environment 82, as in block 112. The rules can include policies defining criteria or thresholds to be met before granting access to a production environment resource.

The software application can be allowed access to the computing production environment based on a testing analysis 70 and use abstraction layers 74 to control allocation of resources in the production environment 80. The testing analysis can be multi-stage and have at least one criterion for each stage before allowing access to a corresponding resource in the production environment.

In one embodiment according to the disclosure a multi-level virtual sandbox (also can be referred to as the virtual computing environment) is within the production environment, and can follow a gradient from highly-fenced to non-fenced. Different policies and validation rules may be performed along the gradient to validate the application is provisioned correctly and safe for public consumption. The disclosed technique(s) is advantageous because it integrates with software development/operations approaches and preserves the developer's direct interaction with the production environment, and also enables newly provisioned application code to be isolated before it is fully accepted into the production workflow. The isolation of the present disclosure enables rigorous validation to be completed to ensure the application does not harm the production environment. Once the application is deemed acceptable, the fencing can be removed to allow the deployed application to become publically accessible and fully functional including access to resources in the production computing environment.

The present disclosure enables a multi-level virtual sandbox in a cloud computing environment for introducing an application for deployment. This enables a fully-fenced to non-fenced gradient enforced by virtual abstraction layers 74 which enable the integration of the virtual computing environment 82 (e.g., as a virtual staging environment).

The method and system of the present disclosure can reduce the number of complex defects in the code of a new application, and protect stability and security of a production environment. The disclosure herein can improve time to delivery by reducing the number of deployments to a single deployment.

Figure 3:
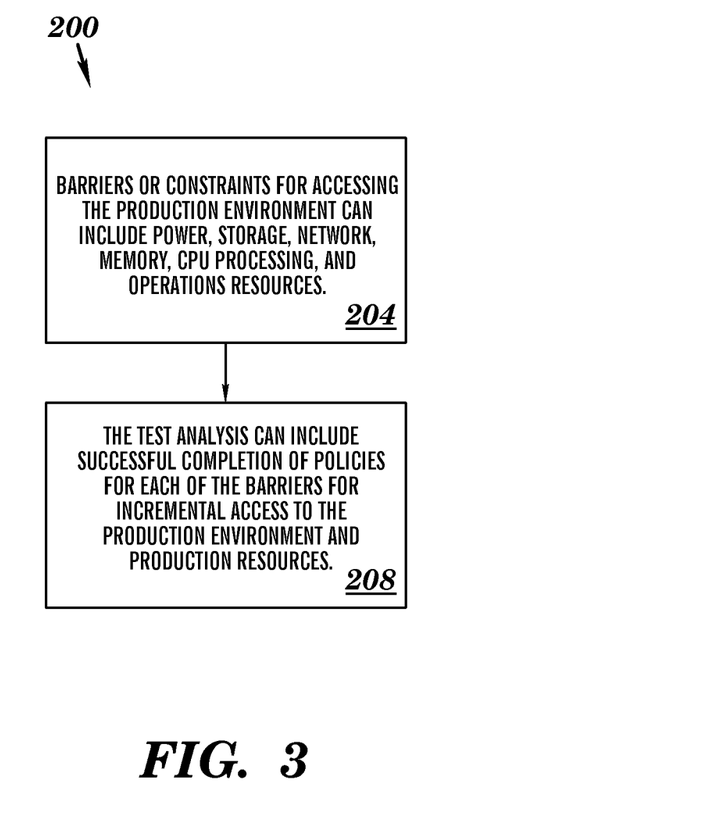
FIG. 3 is a flow chart illustrating a further exemplary method related to the method shown in FIG. 2.

Within a production cloud environment, the method of the present disclosure can isolate new and potentially unsafe application code by defining multiple virtual fences that specify barriers around specific types of resources. Example barriers, constraints, virtual fences, and abstraction layers (which can include testing analysis and multi stage access) for providing access to resources in the computing production as referred to in block 118 of FIG. 2, are discussed below and can optionally be applied. Referring to FIG. 3, a method 200 (which elaborates on blocks 112 and 118 of FIG. 2, refers to exemplary barriers or constraints for allowing access to the computing production environment. Example fences or constraints in the virtual computing environment for accessing production environment resources include power, storage, network, memory, CPU processing, and operations resources, as in block 204 (FIG. 3). The testing analysis 70 (and referred to in block 118 of FIG. 2) can include barriers or constraints based on policies for the application to successfully pass (e.g., by meeting a policy or a criterion), and thereby the application granted access (or unfettered access) to the production environment, as in block 208 (FIG. 3). An application can have policies that it is required to meet in order to be fully deployed in the production environment, and alternatively the application can include multiple parts each having policies directed to the application parts being granted access to the production environment.

An example of a virtual fence can include power constraints wherein a virtual application can be powered off until certain static analysis tests are passed. Another example of a virtual fence can include a storage constraint which can allow the application to allocate a certain amount of storage and/or provide a certain class of storage to the application (e.g., spinning disk vs. solid state, and thin provisioning storage versus thick provisioning).

Another example of a virtual fence or barrier can include network constraints restricting network traffic to specific targets including application components. For example, the network traffic can be restricted to virtual machines (VMs) communicating with other virtual machines, simulation test resources, or security verification systems. Another example of a virtual fence can include CPU (Central Processing Unit)/memory constraints wherein applications can be provisioned with overcommitted with capped CPU and memory to reduce the amount of cloud resources used. Another example of a virtual fence can include application based constraints which allow the application to perform specified operations, or call certain APIs (Application Programming Interface(s)) within the infrastructure.

With each barrier, a policy can be defined to verify the state of the deployment and verify the tasks the software application needs to complete to pass a test, meet the policy, or meet a criteria. After the policy has been verified, the barrier associated with the policy can be removed until all barriers are removed.

One embodiment of a fencing gradient includes the system/method described below. Virtual machines from the deployment of a virtual application can be deployed in a virtual environment, but can remain in a powered off state inside of a virtual sandbox. A static analysis can then be performed on the VMs (e.g., OS configuration file inspections, version checks, virus scans, and one or more algorithms for checking on files including a cryptographic hash function algorithm to verify data integrity. Other testing analysis stages can include analysis of transaction rate, and security analysis. The access to resources can be based on meeting criteria of a stage of testing analysis. The present disclosure can place layers of logical barriers around the deployed application such that it cannot harm the production environment. The layers can then be gradually removed as the application's characteristics are understood and trusted by the method/system of the present disclosure.

After a static analysis policy is verified, the power barrier can be lifted and the VMs can be powered up but within the virtual sandbox with the fencing in place. The application can have restricted network connectivity to local application VMs using firewall or virtual switch configurations, and can have throttled physical resources (e.g., CPU, disk, memory, etc). A test set of transactions can be run against the application from a host that resides within the restricted network access and which validates that the application is functioning properly and not over consuming resources. The resources barrier can then be lifted, and the application can be allowed to use the production level CPU, memory, and disk (including possible storage migration from a virtual machine on one machine to another having higher performance). A set of security tests can be run which can validate that intrusion detection is functioning properly and that the application is safe for production. After passing the required network tests, the network barrier can be lifted and the application can then have full network access. At this point, the application has no more restrictions and the virtual sandbox has been removed. The application is then operating with production level access to the cloud computing environment 1050 (FIG. 5) and its resources.

The present disclosure, for example, offers a method/system for staging an application with the agility of development through a lifecycle. In the present approach, configuration and runtime errors are reduced by introducing the multi-level virtual sandbox environment inside a production environment, which can follow a gradient from highly-fenced to non-fenced resources. The present disclosure enables a virtual fence or sandbox for a given set of VMs in an application workload, with the ability to slowly remove artificial barriers until the VMs can execute unhindered. In other words, the present disclosure allows VMs to become less isolated or completely integrated (un-isolated) over time. Thereby, the present disclosure can provide an environment that is not separate from a customer's production environment, and does not require a separate deployment when the workload is ready to be run in a production environment.

The present disclosure allows an application to be deployed, but into a temporarily restricted environment to ensure safety within the production environment. There is no need for a separate staging environment in a target cloud outside of the production environment. Thereby, an application with unknown properties can be deployed safely into a production environment. The multi-level virtual sandbox around the new application virtual machines (VMs) protects the production environment from any issues that may arise from the application. The sandbox is gradually removed as the application assimilates into the production environment, eventually removing all barriers if the application is successful.

The present disclosure provides a staging technique which is consistent with traditional application deployment lifecycle with the agility of a DevOps lifecycle (e.g., reducing configuration and runtime errors), by introducing a multi-level virtual sandbox environment inside a production environment that follows a gradient from highly-fenced to non-fenced resources. Different policies and validation rules may be performed along the gradient to validate the application is provisioned correctly and ready for public consumption before the fencing is removed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
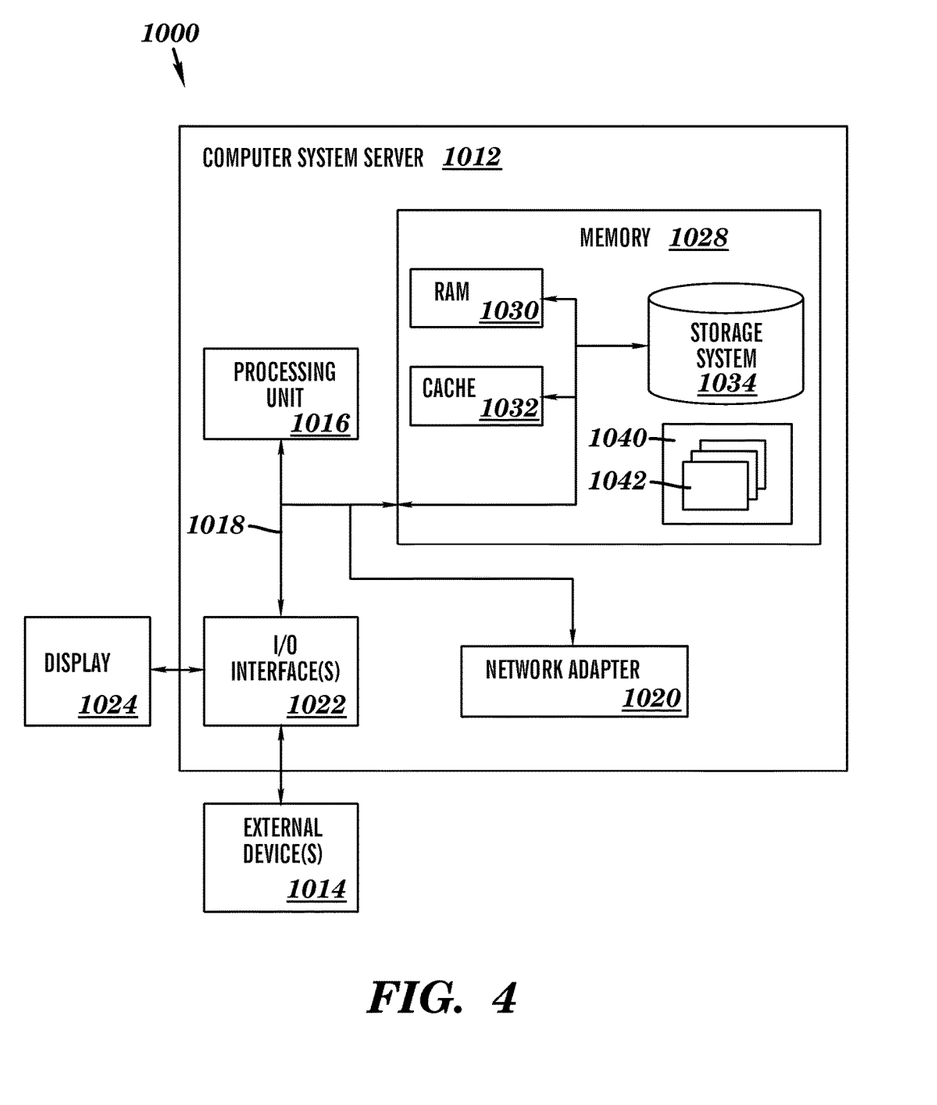
FIG. 4 is a schematic block diagram of a computer system according to an embodiment of the disclosure.

Referring now to FIG. 4, a schematic of an example of a cloud computing node is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 5:
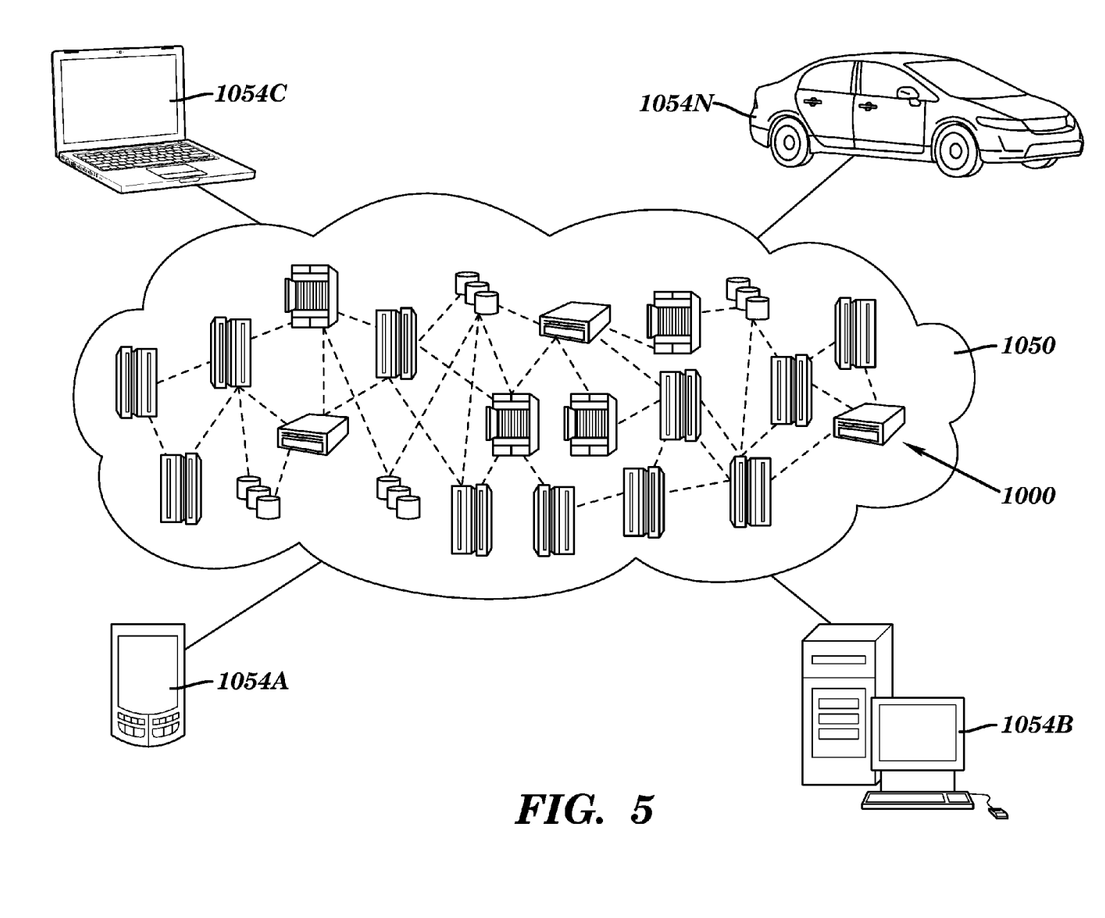
FIG. 5 is a schematic block diagram of an illustrative cloud computing environment, according to an embodiment of the disclosure.

Referring now to FIG. 5, illustrative cloud computing environment 1050 is depicted. As shown, cloud computing environment 1050 comprises one or more cloud computing nodes 1000 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1000 and cloud computing environment 1050 can communicate with any type of computerized device over any type of network and/or network addressable connection (e.g., using a web browser).

Figure 6:
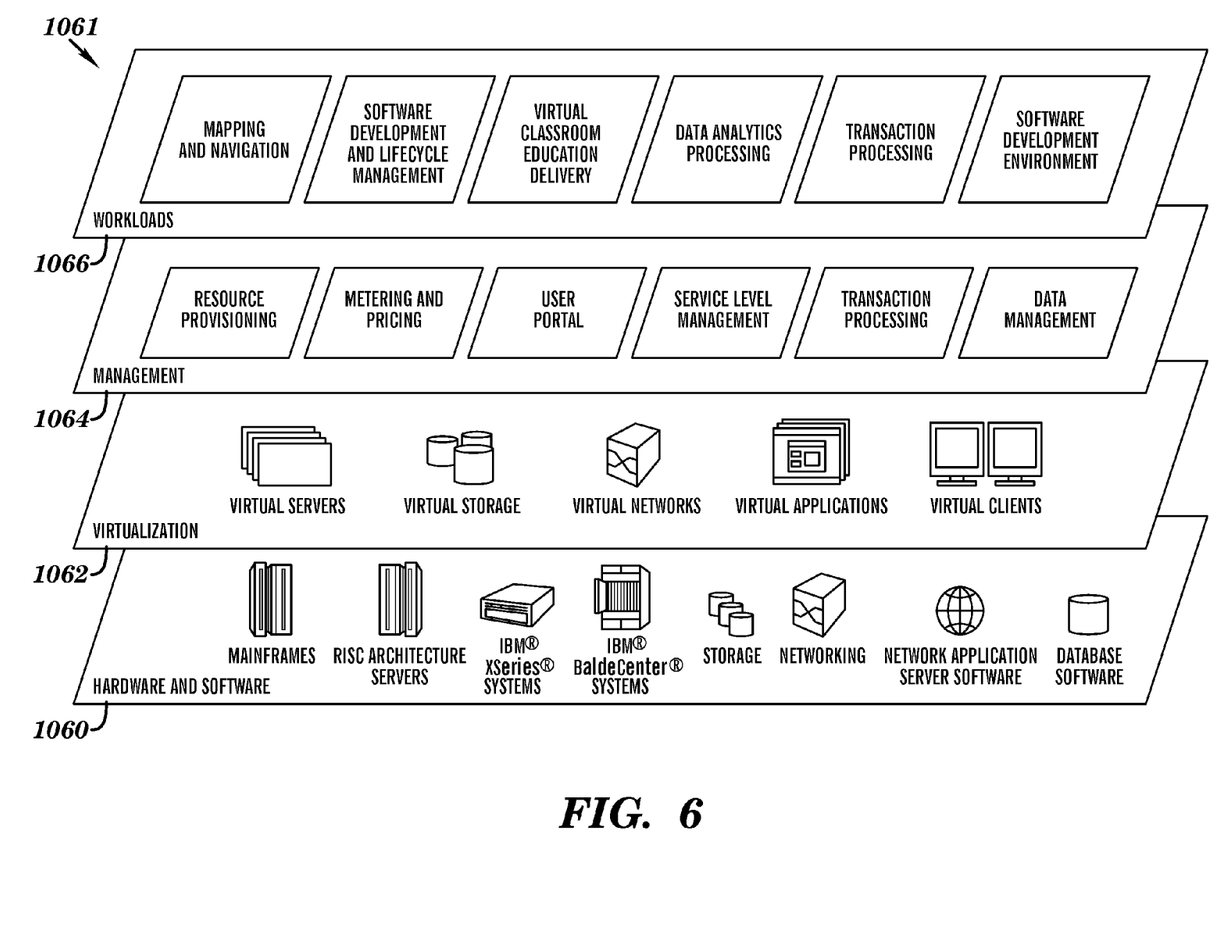
FIG. 6 is a schematic block diagram for a multi-layered functional illustration of the cloud computing environment depicted in FIG. 5, according to an embodiment of the disclosure.

Referring now to FIG. 6, a set of functional abstraction layers 1061 provided by cloud computing environment 1050 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 1060 includes hardware and software components. Examples of hardware components include: mainframes; RISC (Reduced Instruction Set Computer) architecture based servers; storage devices; networks and networking components. In some embodiments, software components include network application server software.

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a software development environment.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for enabling resource consumption for applications running in a virtual environment within a production environment based on a testing analysis, comprising:
   generating a multi-stage virtual computing environment within a computing production environment;
   running a software application in the virtual computing environment;
   providing access to resources in the computing production environment from the virtual computing environment;
   allowing the software application access to the computing production environment from the virtual computing environment based on a testing analysis and using abstraction layers to control allocation of the resources in the production environment;
   the testing analysis includes a rule based criteria for allowing and increasing access of the software application to the resources in the production environment from the virtual computing environment based on meeting the rule based criteria;
   the testing analysis further including stages enforced by the abstraction layers, respectively, and each stage includes a rule based criterion for increasing access to the resources in the production environment for the software application based on the software application meeting the rule based criterion for each of the stages, the stages providing a gradient from highly fenced to non-fenced between the virtual environment and the production environment, and the stages providing barriers associated with the rule based criterion corresponding to the stage and thereby the stages providing the barriers around specific resources in the production environment; and
   the testing analysis having at least one criterion for each of the stages, the at least one criterion providing a threshold being met before granting access to a corresponding production environment resource.

2. The method of claim 1, wherein the stages of the testing analysis include: a static analysis stage, a transaction rate stage, and a security stage.

3. The method of claim 1, wherein the resources comprise: power, storage, network, central processing unit (CPU) processing, and memory resources.

4. The method of claim 1, wherein the virtual environment is a cloud based environment.

5. The method of claim 2, wherein the stages of the testing analysis include a series of stages including the static analysis stage, the transaction rate stage, and the security stage; and
   accessing each of the stages being based on meeting the at least one criterion for each of the stages before the granting of access to the corresponding production environment resource.

* * * * *